Sept. 19, 1967
T. D. READER
3,341,950
BRAILLE READING DEVICE
Filed July 7, 1965
2 Sheets-Sheet 1
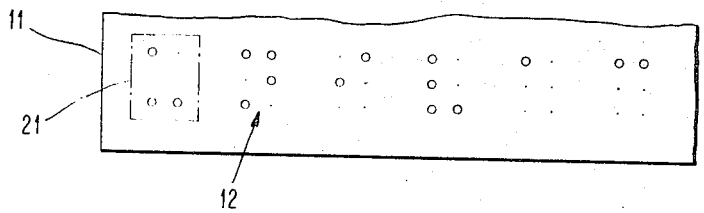
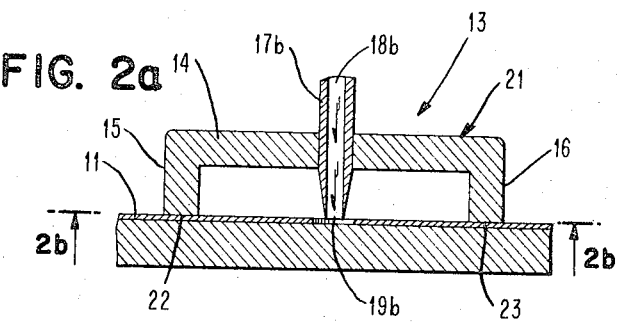
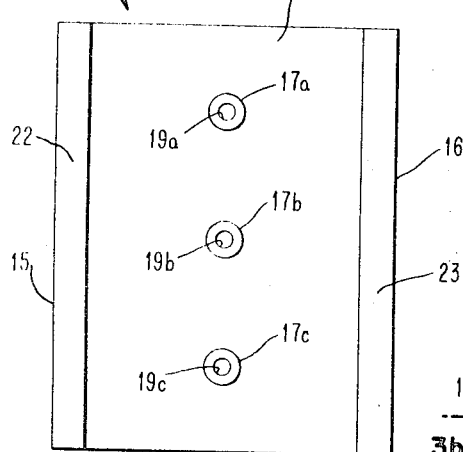
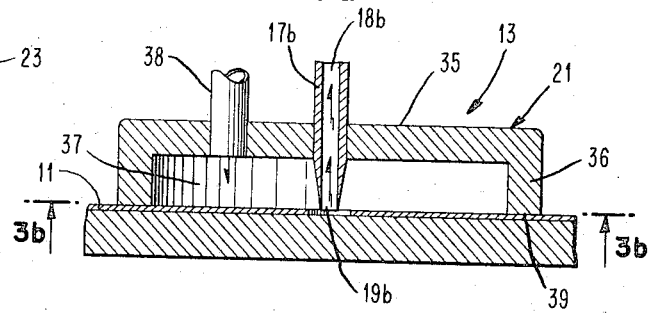
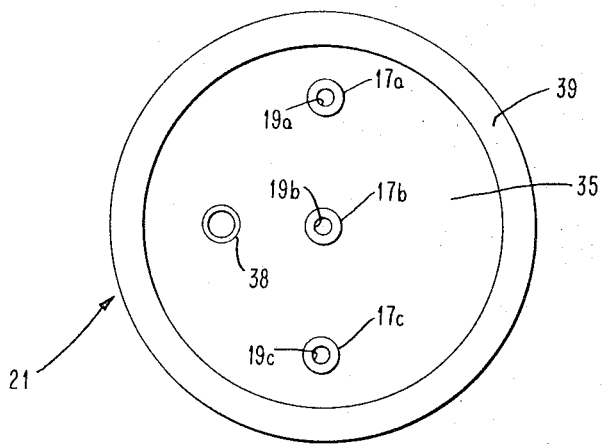
INVENTOR
TREVOR D. READER
BY Thomas P. Murphy
AGENT Sept. 19, 1967          T. D. READER          3,341,950

BRAILLE READING DEVICE

Filed July 7, 1965          2 Sheets-Sheet 2

United States Patent Office 3,341,950
Patented Sept. 19, 1967

3,341,950
BRAILLE READING DEVICE
Trevor D. Reader, King of Prussia, Pa., assignor to Sperry Rand Corporation, New York, N.Y., a corporation of Delaware
Filed July 7, 1965, Ser. No. 470,037
6 Claims. (Cl. 35—35)

ABSTRACT OF THE DISCLOSURE

Disclosed is a pneumatic braille reading device which enables blind persons to read braille code through their sense of hearing. A pneumatic sensing element is adapted to be manually passed over paper containing perforations or raised dimples arranged according to the braille code. As each hole or dimple is passed, the sensing element produces a fluid signal which actuates a distinctive sound producing element according to the hole or dimple position. The sensing element may simultaneously detect more than one perforation or dimple thereby activating a combination of sound producing elements to produce a single distinctive sound readily discernable by a trained ear.

This invention relates to a braille reading device and more particularly to a pneumatic braille reading device for use by blind.

Blind persons read conventional braille utilizing their sense of touch. Conventional braille consists of embossed dots which are protuberances on the surface of paper. These dots are arranged in groups each of which may represent a letter, number or other information necessary for reading. Each group consists of two columns of dots arranged in three rows. The possible combinations of dots and no dots are more than sufficient to provide sensory indications of all the letters in the alphabet, numbers as well as various marks of punctuation. Utilizing this type of braille code any type of printed information may be converted into the braille code for reading by blind persons. Books, newspapers, and various other forms of the printed word may be made available to blind persons by means of this system.

The present invention contemplates a braille reading device which enables blind persons to read braille utilizing their sense of hearing. More specifically, the present invention contemplates a pneumatic apparatus which reads conventional braille code either in the form of the presently used raised dots or in the form of punched holes. However, for purposes of presentation the invention will be described primarily using the punched hole form of braille. This form has an advantage over the raised dot type in that the code containing medium e.g., paper takes up less space. However, since the invention is compatible with the raised dot type of braille, the invention can be used with braille reading material already existing without specially preparing the material as would be necessary with the punched hole type of braille.

Generally the invention consists of a sensing element adapted to be passed over paper containing perforations arranged according to the braille code. For each hole passed the sensing element provides a fluid signal to a fluid amplifier or fluid inverter circuit. This signal is used to activate a distinctive sound producing element.

Where a column in a group contains one hole, a single distinctive sound is produced. Where the column contains two holes, two separate distinctive sounds are produced. These sounds are produced coincidentally and together make one readily identifiable sound. The foregoing is true also where the column contains three holes. Each of the various combinations of holes in the other column in the group provide a distinctive sound. It may be seen that each of the two columns of holes in a group may provide six distinctive sounds. Since each column may provide six distinctive sounds, there are thirty-six possible combinations of two distinctive sounds from each group. Each one of these thirty-six combinations of two sounds is representative of a letter, number, punctuation mark, etc. A blind person may easily be trained to remember these thirty-six combinations and to assimilate their meanings at least as efficiently as he assimilates the meaning of the conventional raised dot type of braille by the use of his sense of touch.

Reading by means of the present invention is faster and more efficient than with the conventional braille system since the ear can resolve data more quickly and efficiently than the fingers.

Due to the use of fluid and fluid amplifier components construction of the present invention is economical and usually long lived.

Over and above the foregoing advantages the many blind persons who are without the sense of touch, for example, amputees and other persons (particularly old people) who have numbness of the fingers due to a variety of disease conditions would find the present invention unusually desirable.

Therefore, it is an object of the present invention to provide a braille reading device which permits utilization of the sense of hearing rather than the sense of touch.

It is another object of the present invention to provide a pneumatic braille reading device wherein the device of the present invention provides a faster and more efficient resolution of data than the conventional braille reading system.

A further object of the present invention is to provide a pneumatic braille reading device ideally suited for blind persons lacking the sense of touch and which can be made available to such persons economically because of the low material and fabrication costs for the manufacture.

Another object of the present invention is to provide a braille reading device utilizing sense of hearing which is compatible with presently existing braille material as well as braille in the form of raised dots.

Other objects and many of the attendant advantages will become more apparent with the reading of the specification in conjunction with the drawings wherein like reference numerals are used for like elements and wherein:

FIGURE 1 shows part of a sheet of paper having the braille code punched therein according to the present invention;

FIGURES 2a and 2b illustrate a side sectional and bottom view, respectively, of the sensing element used in the embodiment of the present invention illustrated in FIGURE 4;

FIGURES 3a and 3b show a side sectional view and bottom view, respectively, of the sensing element used in the embodiment of the present invention shown in FIGURE 5;

Figure 4:
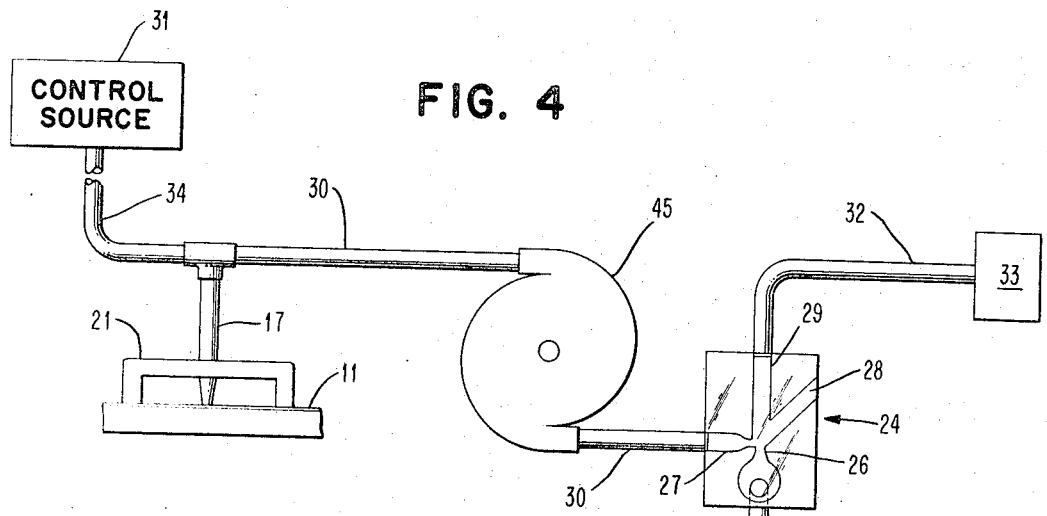
FIGURE 4 illustrates in schematic form a first embodiment of the present invention.

Referring now more particularly to FIGURE 1 there is shown part of a sheet of paper 11 having punched information thereon in the braille code. Each group or cluster 12 of perforations is indicative of a letter, number or punctuation mark. Each group, for example, group 12 comprises two columns arranged in three rows. Each column may contain three perforations or any combination thereof. For example, the braille code arrangement of perforations and non-perforations in group 12 is indicative of the letter U. As aforesaid the perforation could, of course, be raised dots.

Referring now more particularly to FIGURES 2a and 2b there is shown a preferred embodiment of the sensing element 13 of the present invention. The sensing element 13 comprises a carriage 21 which may be made of any material, for example, a transparent plastic. The carriage 21 comprises a flat rectangular portion 14 and two side walls 15 and 16 integral therewith or otherwise attached thereto. The side walls 15 and 16 are disposed at opposite ends of the flat portion 14 and are perpendicular thereto and parallel with each other. The sidewalls 15 and 16 are of equal length and would normally have polished flat portion 22 and 23 in order to enable the carriage 21 to be easily glided over paper.

Extending through the flat portion 14 and rigidly held thereby in an up-right position perpendicular to the horizontal bar are three nozzles 17a, 17b and 17c. Nozzles 17a, 17b and 17c are aligned in a column after the fashion of the columns of perforations shown in FIGURE 1. Likewise, the spacing between individual nozzles is such that it is equal to the spacing between individual perforations in a column of FIGURE 1. As best seen in FIGURE 2a each of the nozzles have fluid passageways 18a, 18b and 18c, respectively. Further, each of the nozzles 17a, 17b and 17c terminates in an orifice shown in FIGURE 2a as orifice 19a, 19b and 19c. The orifices 19 are smaller in diameter than the perforations shown in FIGURE 1.

The nozzles 17a, 17b and 17c extend through the flat portion 14 to a depth equal to the depths of the arms 15 and 16. Thus, as the carriage 21 is glided over the surface of paper, the end of the nozzles 17a, 17b and 17c bear lightly against the surface of the paper blocking the orifices 19. As the carriage 21 is passed over the surface of the paper, for example, the portion of the sheet shown in FIGURE 1 the orifices 19 are normally blocked. However, when the orifices 19 coincide with the center of the perforations, the orifices become unblocked. During this unblocked period air can escape from or enter the respective passageways 18a, 18b and 18c. Although the thickness of the paper is not critical it has been found that the thickness of .005 inch works well in actual practice.

FIGURE 4 illustrates a braille reading device utilizing the sensor element 13 of FIGURES 2a and 2b. The braille reading device of FIGURE 4 comprises a fluid amplifier or more precisely a fluid inverter circuit 24. The fluid inverter 24 comprises an input channel 26 and an output channel 29. The input channel 26 and the output channel 29 are in alignment such that fluid from power source 25 connected to the input channel 26 normally passes through and out of the output channel 29. The fluid inverter 24 further comprises a control channel 27 and a second output channel 28. During the time that the control channel 27 is provided with fluid the fluid from power source 25 is diverted to the output channel 28 where it leaves the system or alternatively it is fed to a common sump not shown. The fluid inverter 24 may be of a conventional type and similar to that shown in Patent Number 3,075,548 issued January 29, 1963 to H. B. Horton for Delay Line Memory. More precisely, the fluid inverter 24 may be similar to the fluid amplifiers 3 or 5 depicted in FIGURE 1 of the identified patent.

The output channel 29 of the inverter 24 is connected to a sound producing elemenut 33, via flexible tube 32. The sound producing element 33 may be any conventional type responsive to air pressure. For example, it may be a reed type whistle or other type of whistle productive of a distinctive sound and frequency when activated.

One end of the nozzle 17 shown in FIGURE 4 is connected to the control channel 27 of the inverter 24 via the flexible conduit 30. A second source of power fluid 31 is connected to the flexible conduit 30 via conduit 34 and communicates therewith. The power source 31 provides a control fluid and is normally at a lesser pressure than that supplied by the power source 25. However, the control source 31 may be the same with the power source 25 provided a fluid resistance were connected between the power source 25 and the flexible conduit 30 so as to reduce the force of the fluid applied over flexible conduit 34.

It should be understood that there is a separate inverter 24 and sound producing element 33 etc., for each of the nozzles 17a, 17b and 17c. Only one has been shown for the sake of brevity.

As the carriage 21 is moved across the sheet of paper 11 containing the groups 12 of perforations, the orifices 19 are normally blocked. Therefore, the fluid from power source 31 directly communicates with the control channel 27 causing the power stream from the input channel 26 to be diverted to the output channel 28. As can plainly be seen the sound producing element 33 is not under this condition activated. When, however, the orifice of say the nozzle 17b coincides with a perforation, the fluid from the power source 31 escapes from the orifice 19 since it is not unblocked. In this situation the power is removed from the control channel 27 thereby causing the power stream to revert to the output channel 29 thereby activating the sound producing element 33. As the carriage 21 is glided a little bit further across the sheet of paper the orifice 19 again becomes blocked and the power stream is again diverted to the output channel 28 thereby deactivating the sound producing element 33.

Since there is an inverter and sound producing element for each of the nozzles 17a, 17b and 17c, the exact combination of perforations and nonperforations within a column of perforations may be easily detected and indicated by a distinctive sound readily capable of assimilation by the human ear. For example, in the first column of the first group of perforations in FIGURE 1 the orifices or nozzles 17a and 17c are unblocked and their associated and respective sound producing elements would be activated providing two separate sounds. Since these separate sounds occur simultaneously, together they provide one distinctive sound indicative of the combination of perforations and nonperforations in the first column of the first group. Similarly, the second column of the first group of perforations in the sheet of paper shown in FIGURE 1 would cause only the orifice of the nozzle 17a to be unblocked. Therefore, only its respective and associated sound producing element would be activated.

The sound produced as a result of the perforations in the first column and the sound produced as a result of the perforation in the second column provide two distinct sounds out of the possible combination of thirty-six pairs of sounds. The two distinct sounds produced by the first group of columns would indicate to a blind person that he had just read the letter U.

The raised dot type of braille may be used with the embodiment of FIGURE 4 with minor modification. For example, the nozzles 17 would have to be raised to pass over the dot with minimum clearance. At the same time, the sound producing element 33 would be connected to the output channel 28 of the inverter 24 and the output channel 29 would be connected to atmosphere or a return duct. When a nozzle 17 coincided with a dot, the associated orifice 19 would be closed and the fluid would switch to the output channel 28 to activate the sound producing element 33. Where there was no coincidence of dots and orifices, the fluid would pass out through the output channel 29 since the orifices 19 would be open.

Figure 6:
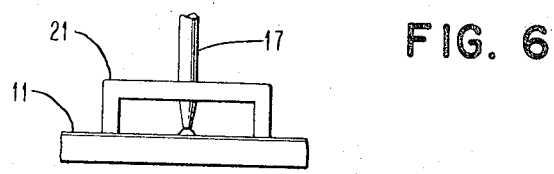
FIGURE 6 illustrates a side sectional view of a sensing element for use with raised dot type of braille.

FIGURE 6 illustrates this embodiment with the appropriate modifications.

FIGURES 3a and 3b illustrate a second embodiment of the sensing element 13 of the present invention. In this embodiment the carriage 21 is comprised of a circular flat portion 35. Integral with or otherwise attached to the flat circular section 35 is a circular wall 36 which together with the flat portion 35 forms the recess or volume 37. An opening 38 extends through the flat portion 35 into the volume 37.

In a manner identical to that shown in FIGURES 2a and 2b nozzles 17a, 17b and 17c extend through the flat portion 35 and are rigidly held therein in an upright position. The end of these nozzles extend to a depth equal to the depth of the circular wall 36 such that when the carriage 21 of FIGURES 3a and 3b is glided over paper the orifices 19 are normally blocked. When the orifices 19 coincide with a perforation in the paper, they become unblocked.

The flat portion 39 of the circular wall 36 is a polished surface permitting the carriage 21 to be glided over a surface with a minimum of friction.

Figure 5:
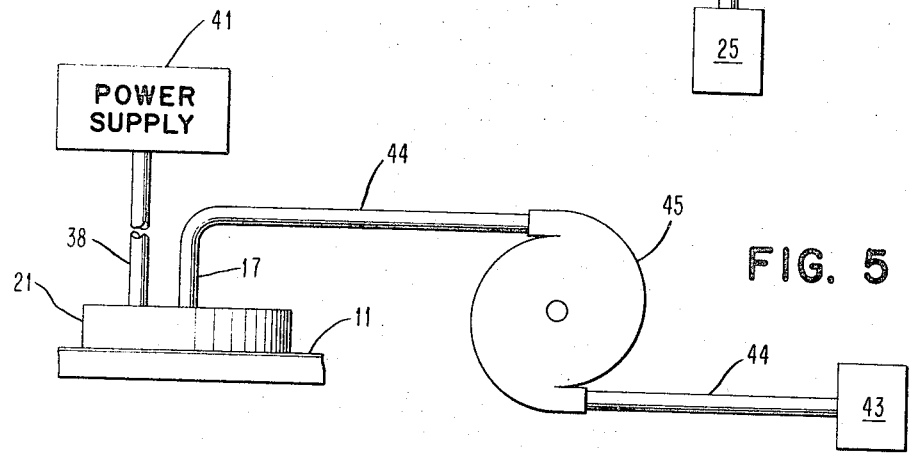
FIGURE 5 illustrates in schematic form a second embodiment of the present invention.

FIGURE 5 illustrates the embodiment of the braille reading device of the present invention which utilizes the sensing element 13 illustrated in FIGURES 3a and 3b. As in FIGURE 4 only that part of the device associated with one nozzle is shown. It should be remembered, however, that there is separate sound producing elements for each of the nozzles.

A source of power fluid 41 is caused to communicate with a volume 37 via the conduit 38. A sound producing element 43 is connected to the nozzle 17 via a flexible conduit 44. When an orifice 19 is blocked, that is, when it is not directly over a perforation, the power fluid from the power source 41 is prevented from entering the flexible conduit 44 to thereby activate the sound producing element 43. However, when the orifice 19 becomes unblocked as when it is over a perforation, the power source 41 is connected to the sound producing element 43 via conduit 38, volume 37 and conduit 44. The sound producing element 43 is thus activated in much the same way as the sound producing element 33. The power source 41 provides sufficient power under normal conditions, but a fluid amplifier may be used to provide a power gain if desired.

Elements 45 represent reels upon which conduits 30 or 44 may be wound and stored so that the conduit may be played out and rewound as the sensing element is moved back and forth across a sheet of code containing material. These elements may be of any conventional type. Alternately, the invention may be practiced without the elements 45 in which case the conduits 30 and 44 would be allowed to fall freely in natural folds.

The embodiments of the invention in which an exclusive property or privilege is claimed are defined as follows:

1. A device for reading braille code in the form of raised dots on the surface of a sheet of paper, comprising in combination: a nozzle terminating in an orifice at one end, carriage means rigidly holding said nozzle in an upright position so that said one end of said nozzle just clears said raised dots as said carriage means is moved contiguously over said surface, a fluid inverter comprising an input channel, a control channel, and first and second output channels, a source of power fluid connected to said input channel, a conduit connecting the other end of said nozzle to said control channel, a source of control fluid connected to said conduit maintaining the power fluid in said second output channel only when said orifice is blocked when it coincides with a raised dot, means connected to said second output channel producing a distinctive sound when said orifice is blocked.

2. In a braille reading device: a sensing element comprising a cylindrical member enclosing a volume and being open at one end, at least one nozzle terminating in an orifice at one end passing through said member and held thereby in a position so that said one end of said nozzle bears lightly against any surface with which said open end of said cylinder is contiguous, fluid responsive sound producing means, a conduit connecting the other end of said nozzle to said sound producing means, a source of fluid communicating with said enclosed volume whereby when said orifice is unblocked a distinctive sound is produced by said sound producing means.

3. A pneumatic device for reading braille code arranged in the form of perforations through the surface of a sheet of recording material, comprising in combination: a plurality of nozzles, each of said nozzles terminating at one end in an orifice, carriage means supporting each of said nozzles in parallel relationship with the distance between adjacent ones of said nozzles being equal to the distance separating adjacent perforations in a column of braille code, said carriage means supporting said nozzles such that said one end of each bears lightly against a surface over which said carriage means is glided, a fluid inverter for each of said nozzles, said fluid inverter comprising an input channel, a control channel, and first and second output channels, a sound producing means for each of said fluid inverters and connected to the first output channel of its respective fluid inverter, each of said sound producing means producing a distinctive sound relative to the others in response to fluid in said first output channel, a source of power fluid connected to said input channels of each of said fluid inverters, a separate fluid conduit connecting each of said nozzles to the control channel of its respective inverter, a source of control fluid connected to each of said conduits providing a control fluid to the respective control channels only when the associated orifice is blocked, each of said fluid inverters being responsive to control fluid in respective control channels to maintain said power fluid in respective second output channels and further responsive to the absence of a control fluid to switch the power fluid to said first output channel whereby when any one of said orifices is unblocked by coincidence with a perforation the associated sound producing means is activated by the fluid in said first output channel and further whereby the combination of sounds produced by said sound producing means indicates the braille code detected by said nozzles.

4. A pneumatic device for reading braille code arranged in the form of discrete indicia on the surface of a sheet of recording material, comprising in combination: a plurality of nozzles, each of said nozzles terminating at one end in an orifice, carriage means supporting each of said nozzles in parallel relationship with the distance between adjacent ones of said nozzles being equal to the distance separating adjacent indicia in a column of braille code, said carriage means supporting said nozzles such that said orifices of each is blocked by the indicia on the surface over which said carriage means is glided, a fluid inverter for each of said nozzles, said fluid inverter comprising an input channel, a control channel, and first and second output channels, a sound producing means for each of said fluid inverters and connected to the first output channel of its respective fluid inverter, each of said sound producing means producing a distinctive sound relative to the others in response to fluid in said first output channel, a source of power fluid connected to said input channels of each of said fluid inverters, a separate fluid conduit connecting each of said nozzles to the control channel of its respective inverter, a source of control fluid connected to each of said conduits providing a control fluid to the respective control channels only when the associated orifice is blocked, each of said fluid inverters being responsive to control fluid in its respective control channel to switch said power fluid to its respective first output channel and further responsive to the absence of a control fluid to switch the power fluid to said second output channel whereby when any one of said orifices is blocked the associated sound producing means is activated by the fluid in said first output channel and further whereby the combination of sounds produced by said sound producing means indicates the braille code detected by said nozzles.

5. A pneumatic reading device for reading braille code arranged in the form of raised dots formed in the surface of a sheet of recording material, comprising a plurality of fluid nozzles one for each code position in a column of braille code, carriage means supporting each of said nozzles in spaced relationship wherein the spacing between nozzles equals the distance between adjacent dot positions in a column of braille code, said carriage means holding said nozzles so that one end of said nozzle just clears said raised dots as the carriage is manually moved over the surface of the recording material, a separate fluid actuated sound producing means for each of said nozzles, each of said sound producing means being adapted to produce a distinctive sound, a source of fluid for energizing each of said sound producing means, a separate fluid switch element coupling each of said sound producing means to said source of fluid, and separate conduits connecting each of said nozzles to a respective fluid switch, said conduits acting whenever its associated nozzle is blocked by a raised dot to actuate the respective switch and thereby energize the associated sound producing means whereby the combination of sounds produced by said sound producing means indicates the braille code detected by said nozzles.

6. A pneumatic reading device for reading holes formed in a recording sheet wherein one or more holes are arranged in columnar form and spaced to represent different coded characters comprising, a plurality of fluid nozzles one for each hole position in a code column, carriage means supporting each of said nozzles in spaced relationship wherein the spacing between nozzles equals the distance between adjacent hole positions in the columnar code, said carriage means holding said nozzles so that one end of said nozzle bears lightly against the surface of said recording sheet as the carriage is manually moved thereover, a separate fluid actuated signal generator for each of said nozzles, each of said signal generators being adapted to generate a distinct signal relative to the others, a source of fluid for actuating said signal generators, a separate fluid switch element coupling each of said signal generators to said source of fluid, and separate conduits coupling each of said nozzles to a respective fluid switch, said conduits acting whenever its associated nozzle is unblocked by a hole in the recording sheet to actuate the respective switch and thereby to actuate the associated signal generator whereby the combination of signals produced by said signal generators indicates the code character detected by said nozzles.

References Cited

UNITED STATES PATENTS

| | | | |
|---|---|---|---|
| 563,415 | 7/1896 | Roolins | 84—89 |
| 2,412,183 | 12/1946 | Taylor | 35—35.1 |
| 3,007,259 | 11/1961 | Anma et al. | 35—35.1 |
| 3,191,008 | 6/1965 | Wadey | 235—201 |

EUGENE R. CAPOZIO, *Primary Examiner.*

W. GRIEG, *Assistant Examiner.*